United States Patent
Brei et al.

(10) Patent No.: US 12,070,770 B2
(45) Date of Patent: Aug. 27, 2024

(54) COMPOSITE COATINGS HAVING IMPROVED UV AND PAINT STRIPPING RESISTIVITY AND METHODS FOR MAKING SAME

(71) Applicant: The Boeing Company, Arlington, VA (US)

(72) Inventors: Mark R. Brei, Ladson, SC (US); Kevin D. Gordon, Summerville, SC (US); Anthony M. Westren, Mount Pleasant, SC (US); Meredith P. Nix, Charleston, SC (US); Kjersta Larson-Smith, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 16/515,121

(22) Filed: Jul. 18, 2019

(65) Prior Publication Data
US 2021/0016319 A1  Jan. 21, 2021

(51) Int. Cl.
*B05D 7/00* (2006.01)
*C09J 163/00* (2006.01)

(52) U.S. Cl.
CPC .......... *B05D 7/584* (2013.01); *C09J 163/00* (2013.01); *B05D 2201/02* (2013.01); *B05D 2420/00* (2013.01); *B05D 2503/00* (2013.01); *B05D 2504/00* (2013.01); *C09J 2463/006* (2013.01)

(58) Field of Classification Search
CPC ............... B05D 7/584; B05D 2504/00; B05D 2420/00; B05D 2201/02; B05D 2503/00; C09J 163/00; C09J 2463/006
See application file for complete search history.

(56) References Cited

U.S. PATENT DOCUMENTS

| | | | |
|---|---|---|---|
| 6,607,358 B2 | 8/2003 | Finn et al. | |
| 2010/0151186 A1 | 6/2010 | Hebert | |
| 2010/0151239 A1* | 6/2010 | Hebert | B32B 27/40 428/351 |
| 2011/0014356 A1* | 1/2011 | Fornes | C09D 7/70 427/58 |
| 2014/0294594 A1* | 10/2014 | Spoonire | F04D 29/023 416/230 |
| 2018/0194922 A1* | 7/2018 | Marx | C08K 3/14 |

OTHER PUBLICATIONS

PPG Aerospace, "Desothane HS CA8000 Polyurethane Topcoats (US)", http://www.ppgaerospace.com/getmedia/c1eb40cb-143e-4e7a-990f-181e49f15569/CA8000-US-TDS.pdf?ext=.pdf (Year: 2021).*
Heatcon, "HCS2404-050—Cytec Adhesive Film 1515-4", https://www.heatcon.com/product/hcs2404-050-film/ (Year: 2021).*
Heatcon, "HCS2402-050—Cytec Carbon Fiber Prepreg 934/PWC T300 UT", https://www.heatcon.com/product/hcs2402-050-prepreg/ (Year: 2021).*
Cytec, Metlbond 1515-3 Film Adhesive Data Sheet, 2010, https://www.e-aircraftsupply.com/MSDS/103222cytec%20Metlbond%201515-3%20tds.pdf (Year: 2010).*

* cited by examiner

*Primary Examiner* — Callie E Shosho
*Assistant Examiner* — Bethany M Miller
(74) *Attorney, Agent, or Firm* — COATS & BENNETT, PLLC

(57) ABSTRACT

A composite structure having a co-curable or co-cured coated epoxy-based composite material coated with a co-curable epoxy-based adhesive surfacing material layer and a polyurethane-based coating material layer, along with components and large objects including the co-curable or co-cured coated epoxy-based composite structures.

21 Claims, 8 Drawing Sheets

COMPOSITE COATINGS HAVING IMPROVED UV AND PAINT STRIPPING RESISTIVITY AND METHODS FOR MAKING SAME

TECHNOLOGICAL FIELD

The present disclosure relates generally to the field of composite materials. More specifically the present disclosure relates to the field of material surface preparation to counter UV degradation of composite material parts and components.

BACKGROUND

The use of composite materials in the manufacture of various structures continues to increase. At least due to their strength versus weight ratio, composite materials offer advantages as replacement materials for denser materials such as, for example, metals, metal alloys, etc., for example, where the overall weight of a completed structure (or the weight of a component of a completed structure) is a consideration in the selection of materials used in the manufacture of such a completed structure (or in the manufacture of a component of a completed structure).

Composite materials are often layered into laminates that have a number of composite material layers, often called "prepregs". Prepregs are "pre-impregnated" composite fibers where a matrix material, such as an epoxy resin-containing material, is already present. The fibers often take the form of a weave and the matrix is used to bond them together and to other components during manufacture. The composite matrix material is typically partially cured to allow easy handling. Such composite matrix material may require cool or cold storage to prevent further partial curing, or complete curing, and such composite matrix material is referred to as B-Stage material. Consequently, B-Stage prepregs are stored in cooled areas, as ambient heat can accelerate complete polymerization. Prepregs also allow one to impregnate a bulk amount of fiber and then store the prepreg in a cooled area for an extended time until a later cure. Prepregs are typically formed on a flat workable surface. Stacks of prepreg plies are then formed and, if desired, can be shaped into a desired shape using shaping or forming tools, also called mandrels.

Composite materials are typically post-processed or "reworked", for example, to re-paint and/or resurface composite materials. For example, primers and paint coatings that include a UV mitigation or a UV "blocking" agent can be applied to a composite material surface for the purpose of protecting a composite material surface from oxidation and/or discoloration that can be caused, for example, by exposing the composite material to ultraviolet (UV) radiation during the use of the composite material as a construction material in the manufacture of, for example, a larger structure.

Material layers that can be deposited as, for example, coatings can be added to a composite material surface for the purpose of changing the characteristics of a composite material. For example, primers or other coating layers can be added to a composite material to improve adhesion of subsequent coating layers such as, for example, paints, topcoats, etc., to a composite material surface that may already have one or more other coatings applied. The layering of coating materials onto composite material surfaces is labor intensive, time-consuming and can add substantial weight to large objects and large structures that include such composite materials having multiple coating layers.

However, paint stripping processes that remove various paint coating layers from composite materials often damage protective surfacing layers applied to composite materials and that are applied beneath paint coating layers can require significant resurfacing once the paint layers are stripped from the surfacing layers.

In addition, one or more of the composite material coating layers can each require separate surfacing preparation steps and procedures prior to the subsequent deposition of one or more coating layers onto composite material surfaces. In some instances, a portion of one or more previously deposited coating must be removed, or otherwise reworked, before adding further coating layers. Such intermediate reworking of composite material surfaces during the treatment of composite material surfaces is also labor-intensive, time-consuming, and costly.

SUMMARY

According to a present aspect, included herein is a co-curable coated epoxy-based composite structure including a co-curable epoxy-based composite material; a co-curable epoxy-based adhesive surfacing material layer disposed onto the co-curable epoxy-based composite material and a co-curable polyurethane-based coating material layer disposed onto the co-curable epoxy-based adhesive surfacing material layer.

Other aspects include a co-cured polyurethane-coated epoxy-based composite structure including a co-cured epoxy-based composite material; a co-cured epoxy-based adhesive surfacing material co-cured onto the co-curable epoxy-based composite material; a co-cured polyurethane-based coating material layer co-cured onto the co-curable epoxy-based adhesive surfacing material; and wherein said co-cured epoxy-based composite material, said co-cured epoxy-based adhesive surfacing material, and said co-cured polyurethane-based coating material layer are co-cured at a temperature ranging from about 250° F. to about 350° F.

According to a present aspect, a method for improving UV radiation resistance of a composite material is disclosed, with the method including applying a co-curable epoxy-based adhesive surfacing material layer to an outer surface of a co-curable epoxy-based composite material, applying a co-curable polyurethane-based coating material layer to the co-curable epoxy-based adhesive surfacing material to form a polyurethane-coated co-curable epoxy-based composite material, and exposing the polyurethane-coated co-curable epoxy-based composite material to a curing regimen to form a co-cured epoxy-based composite structure.

According to another aspect, a co-curable coated epoxy-based composite structure is disclosed including a co-curable epoxy-based composite material, a co-curable epoxy-based adhesive surfacing material layer disposed onto the co-curable epoxy-based composite material, and a co-curable polyurethane-based coating material layer disposed onto the co-curable epoxy-based adhesive surfacing material.

In another aspect, the co-curable epoxy-based composite material, the co-curable epoxy-based adhesive surfacing material, and the co-curable polyurethane-based coating material layer are co-curable at a temperature ranging from about 250° F. to about 400° F.

In another aspect, the co-curable epoxy-based adhesive surfacing material is co-curable at a temperature ranging from about 150° F. to about 350° F.

In a further aspect, the co-curable epoxy-based composite material and said co-curable polyurethane-based coating material layer are co-curable at a temperature ranging from about 250° F. to about 350° F.

In a further aspect, the co-curable epoxy-based adhesive surfacing material layer includes an amount of an epoxy-based material having a curing temperature ranging from about 250° F. to about 400° F., and a Tg ranging from about 300° F. to about 450° F., and a gel time ranging from about 5 to about 20 minutes when held at a temperature ranging from about 240° F. to about 260° F.

In another aspect, the co-curable epoxy-based adhesive surfacing material comprises an amount of an epoxy-based material having a curing temperature ranging from about 250° F. to about 400° F., and a Tg ranging from about 320° F. to about 400° F., and a gel time ranging from about 5 mins. to about 20 mins. when held at a temperature of ranging from about 240° F. to about 260° F.

In another aspect, the co-curable epoxy-based adhesive surfacing material comprises an amount of an epoxy-based material having a curing temperature ranging from about 250° F. to about 400° F., and a Tg ranging from about 330° F. to about 350° F., and a gel time ranging from about 5 mins. to about 20 mins. when held at a temperature of ranging from about 240° F. to about 260° F.

According to another aspect, the co-curable epoxy-based composite material in a co-cured state has a UV transmittance value of 0% for UV wavelengths ranging from about 200 nm to about 800 nm when the co-curable polyurethane-based coating material layer comprises an average layer thickness ranging from about 2 mils to about 3 mils.

According to another aspect, the co-cured epoxy-based composite material in a co-cured state resists discoloration caused by exposure to UV radiation.

In another aspect, the co-cured epoxy-based adhesive surfacing material in a co-cured state can withstand 48 hours of direct exposure of a paint stripping agent selected from the group including phosphate ester hydraulic fluids, benzyl alcohol, terpene, etc., without visible damage to the co-curable epoxy-based adhesive surfacing material in the co-cured state.

In another aspect, the co-curable epoxy-based adhesive surfacing material in a co-cured state comprises a pencil hardness value according to ASTM D 3363-05(2011)e2 of at least HB or higher after 48 hours of exposure to direct exposure of a benzyl alcohol-based paint stripping agent.

According to another aspect, a co-cured composite structure is disclosed including a co-cured epoxy-based composite material, a co-cured epoxy-based adhesive surfacing material co-cured onto the co-cured epoxy-based composite material, a co-cured polyurethane-based coating material layer disposed onto and co-cured onto the co-cured epoxy-based adhesive surfacing material, and wherein said co-cured epoxy-based composite material, said co-cured epoxy-based adhesive surfacing material, said co-cured polyurethane-based coating material layer are co-cured at a temperature ranging from about 250° F. to about 350° F.

In another aspect, the co-cured epoxy-based composite material, the co-curable epoxy-based adhesive surfacing material, and the co-curable polyurethane-based coating material layer are co-cured at a temperature ranging from about 250° F. to about 400° F.

In a further aspect, the co-cured epoxy-based adhesive surfacing material layer includes an amount of an epoxy-based material having a curing temperature ranging from about 250° F. to about 400° F., and a Tg ranging from about 300° F. to about 450° F., and a gel time ranging from about 5 to about 20 minutes when held at a temperature ranging from about 240° F. to about 260° F.

In another aspect, the co-cured epoxy-based adhesive surfacing material comprises an amount of an epoxy-based material having a curing temperature ranging from about 250° F. to about 400° F., and a Tg ranging from about 320° F. to about 450° F., and a gel time ranging from about 5 mins. to about 20 mins. when held at a temperature of ranging from about 240° F. to about 260° F.

In another aspect, the co-cured epoxy-based adhesive surfacing material comprises an amount of an epoxy-based material having a curing temperature ranging from about 250° F. to about 400° F., and a Tg ranging from about 330° F. to about 350° F., and a gel time ranging from about 5 mins. to about 20 mins. when held at a temperature of ranging from about 240° F. to about 260° F.

In another aspect, the co-cured polyurethane-based coating material layer comprises a UV radiation transmissivity value of 0% for UV wavelengths ranging from about 200 nm to about 800 nm when the co-cured polyurethane-based coating material layer comprises an average layer thickness ranging from about 2 mils to about 3 mils.

In another aspect, the co-cured composite material has the ability to withstand 48 hours of direct exposure of a benzyl alcohol-based paint stripping agent (e.g., phosphate ester hydraulic fluids, benzyl alcohol, terpene, etc.) without visible damage to the co-curable epoxy-based adhesive surfacing material, and wherein the co-curable epoxy-based adhesive surfacing material in a co-cured state comprises a pencil hardness value according to ASTM D 3363-05(2011)e2 of at least HB or higher after 48 hours of exposure to direct exposure of a benzyl alcohol-based paint stripping agent.

In another aspect, the co-cured epoxy-based composite material resists discoloration when exposed to UV radiation wavelengths ranging from about 200 nm to about 800 nm.

In a further aspect, an object, that can be a vehicle includes a co-cured epoxy-based composite structure including a co-curable epoxy-based composite material, a co-curable epoxy-based adhesive surfacing material disposed onto the co-curable epoxy-based composite material, a co-curable polyurethane-based coating material layer disposed onto the co-curable epoxy-based adhesive surfacing material, and wherein said co-cured epoxy-based composite material, said co-cured epoxy-based adhesive surfacing material, said co-cured polyurethane-based coating material layer are co-cured at a temperature ranging from about 250° F. to about 400° F.

In another aspect, the co-curable epoxy-based surfacing material is configured to begin curing at a temperature ranging from about 150° F. to about 400° F.

In a further aspect, the co-curable epoxy-based adhesive surfacing material forms a miscible layer with the outer surface of the co-cured epoxy-based composite material.

In another aspect, the co-cured polyurethane-based coating material layer has an electrical resistance value greater than 1000 kΩ.

According to a further aspect, a method is disclosed for improving UV radiation resistance of an epoxy-based composite material, with the method including applying a co-curable epoxy-based adhesive surfacing material layer to an outer surface of a co-curable epoxy-based composite material, applying a co-curable polyurethane-based coating material layer to the co-curable epoxy-based adhesive surfacing material to form a co-curable polyurethane-coated epoxy-based composite material, co-curing the co-curable polyurethane-coated co-curable epoxy-based composite material at a predetermined curing regimen to form a co-cured epoxy-based composite structure, and wherein the co-cured epoxy-based composite structure has a UV transmittance value of 0% for UV wavelengths ranging from about 200 nm to about 800 nm when the co-curable polyurethane-based coating material layer comprises an average layer thickness ranging from about 2 mils to about 3 mils.

In another aspect, a method further includes forming a miscible layer on the exterior of epoxy-based composite material, said miscible layer comprising an amount of epoxy-based material from the epoxy-based composite material and the epoxy-based adhesive surfacing material layer.

In another aspect, a method optionally includes applying a tack material layer to at least one surface of at least one of: the epoxy-based composite material; the epoxy-based adhesive surfacing film; and the polyurethane-based coating material The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
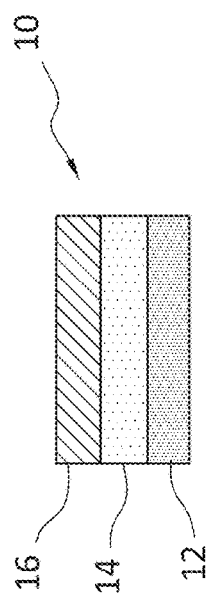
Figure 2:
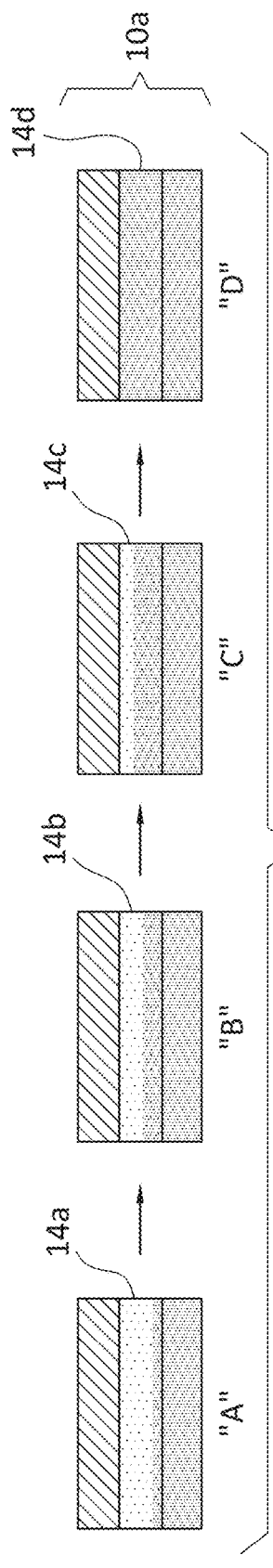
Figure 3:
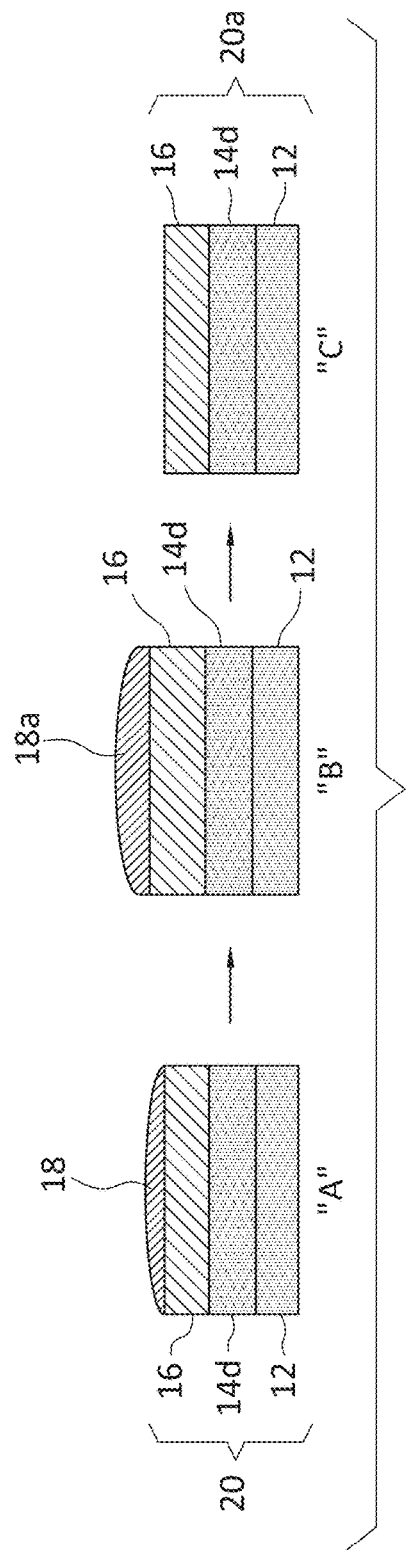
Figure 4:
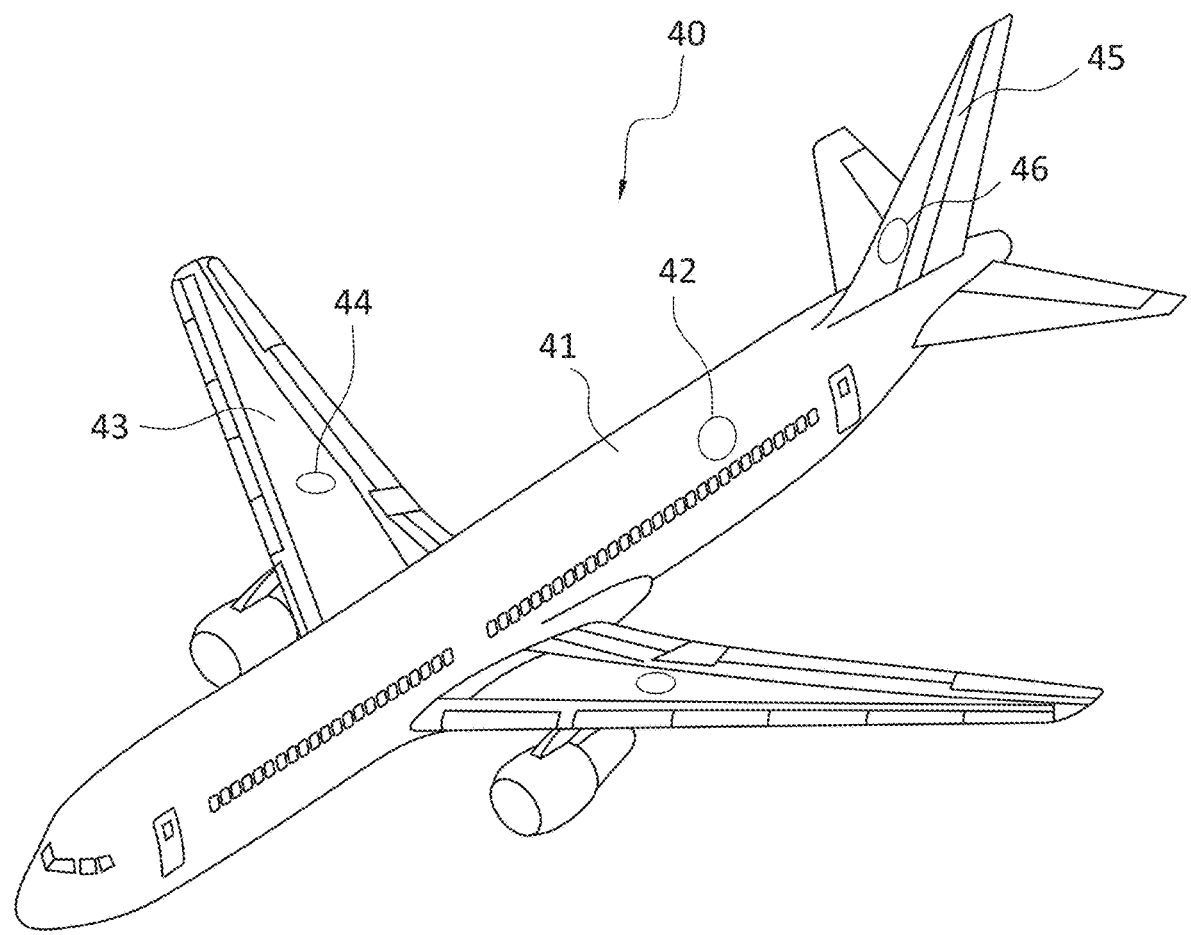
Figure 5:
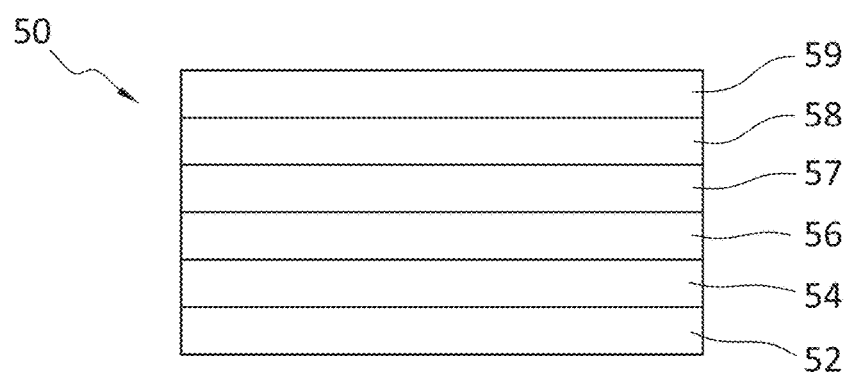
Figure 6:
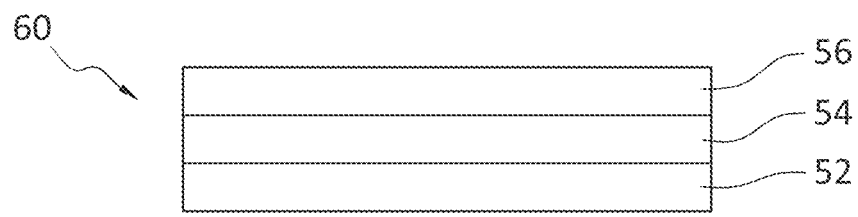
Figure 7:
Figure 8:
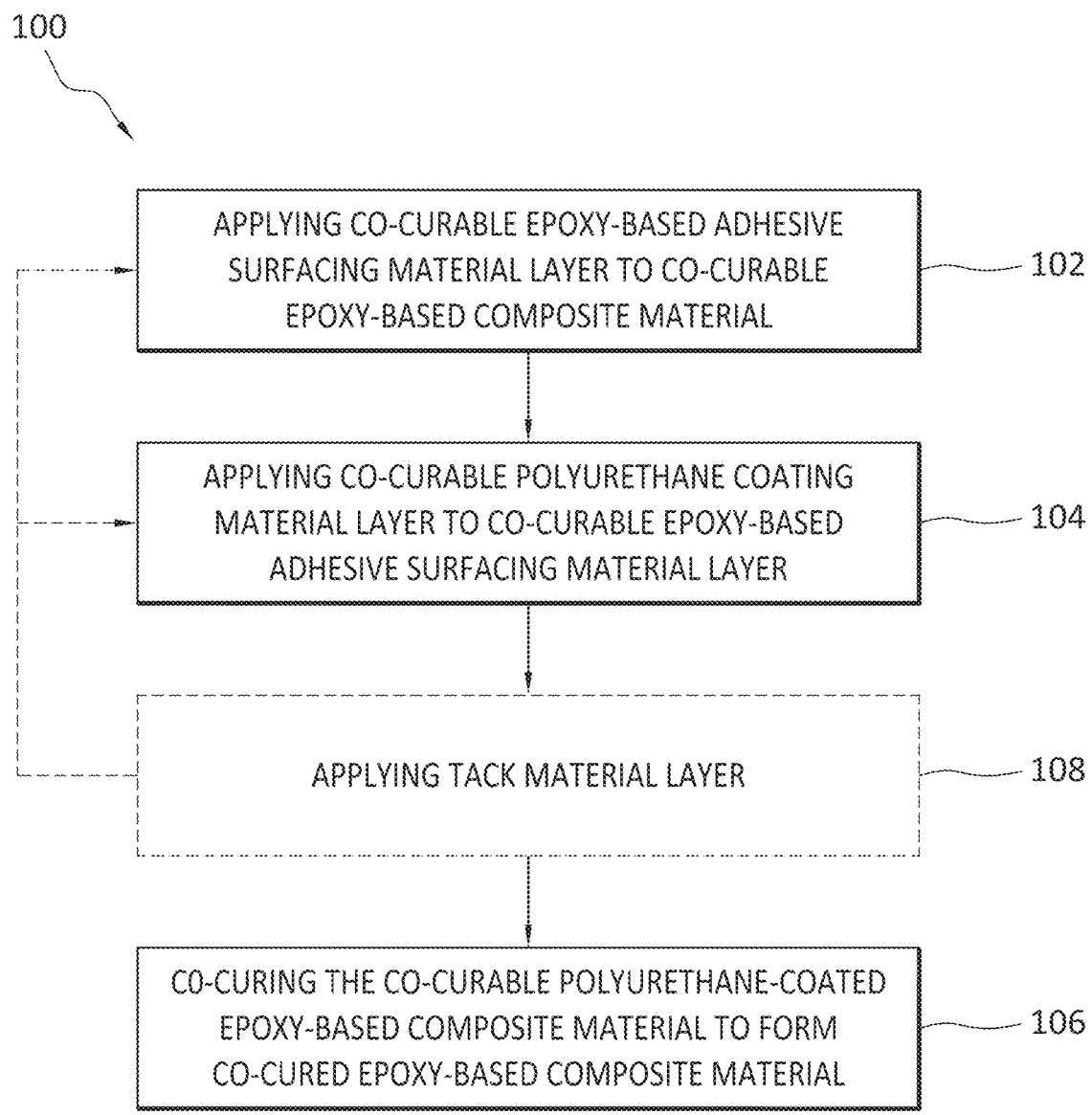
Figure 9:
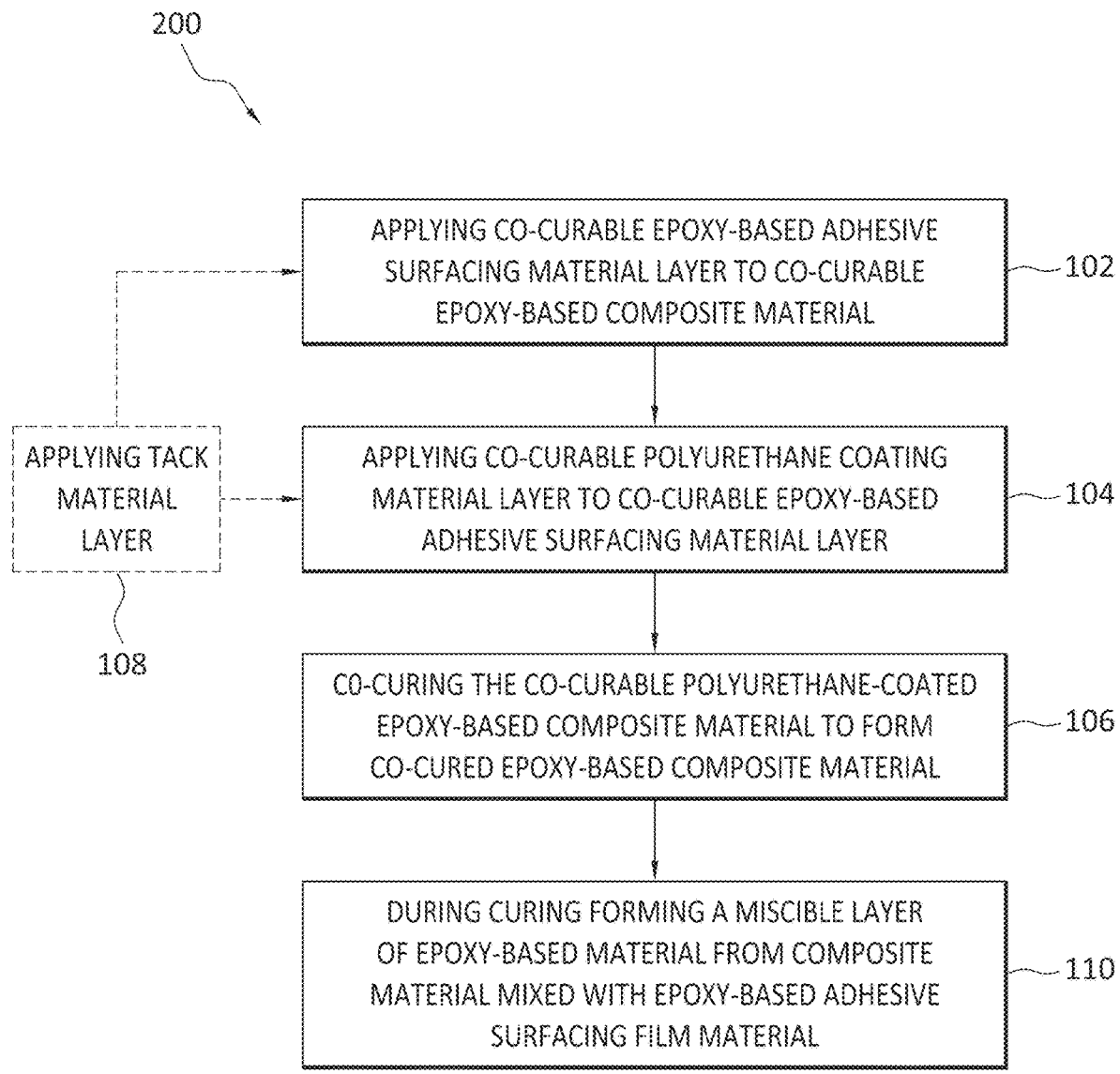
Figure 10B:
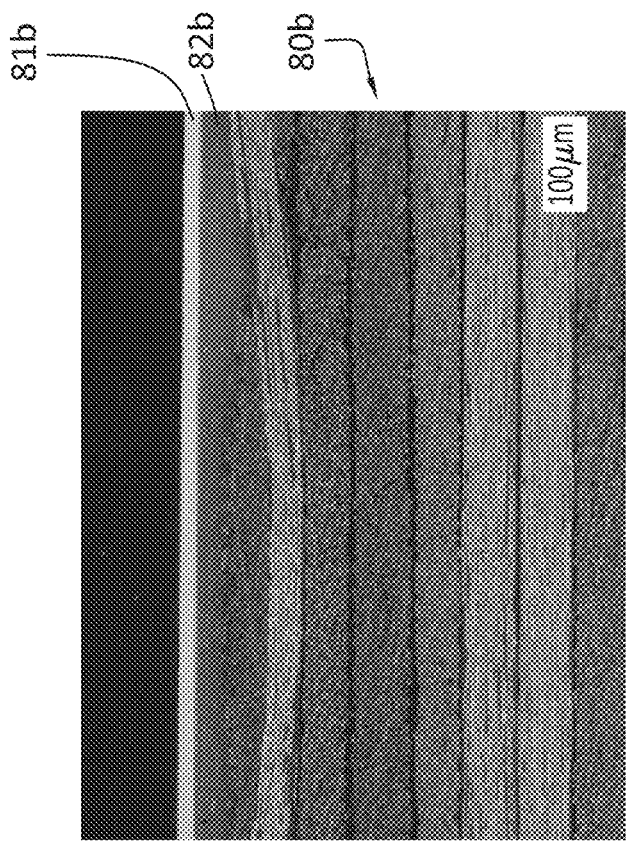
Figure 10A:
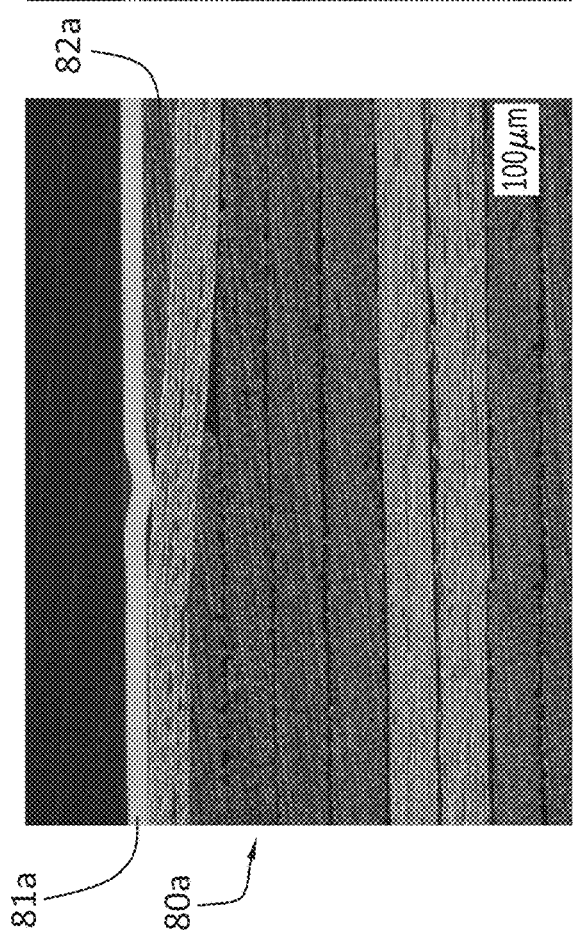
Figure 11B:
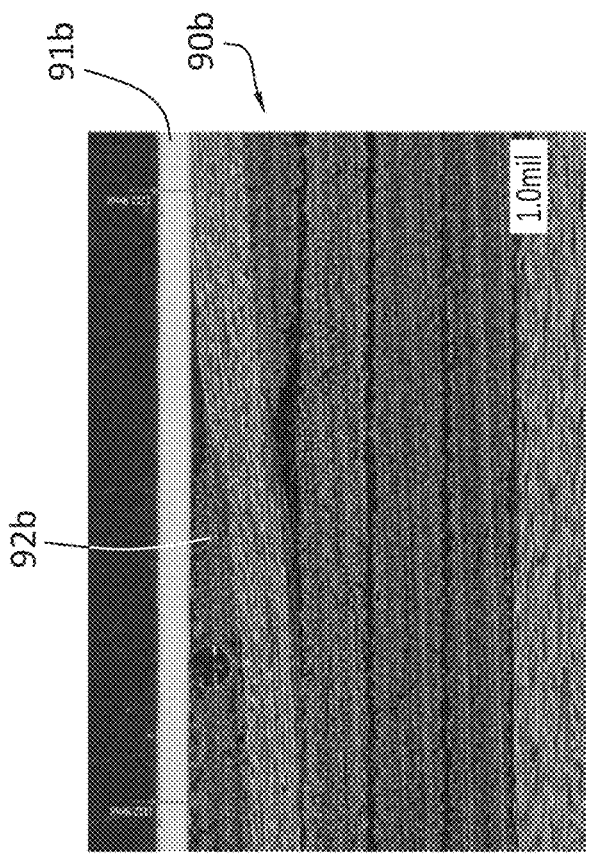
Figure 11A:
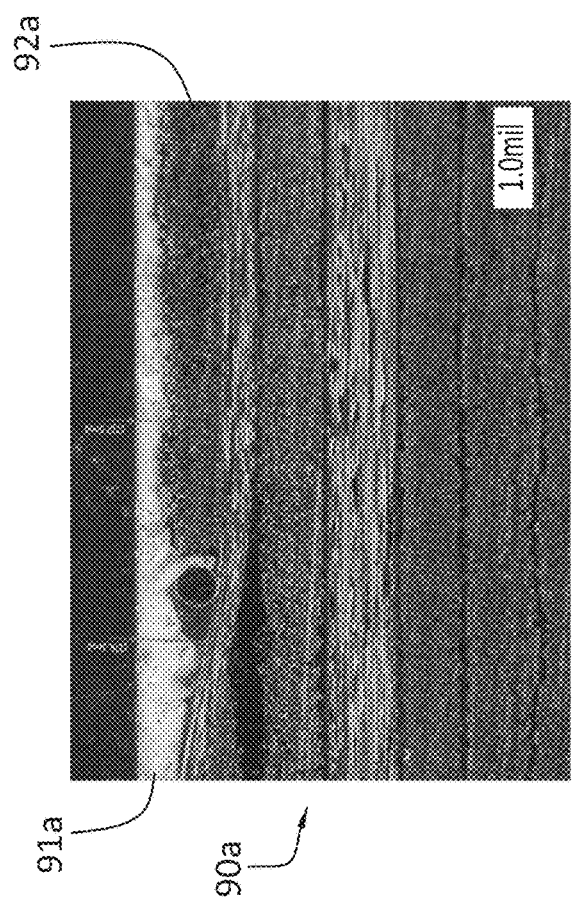
Figure 12A:
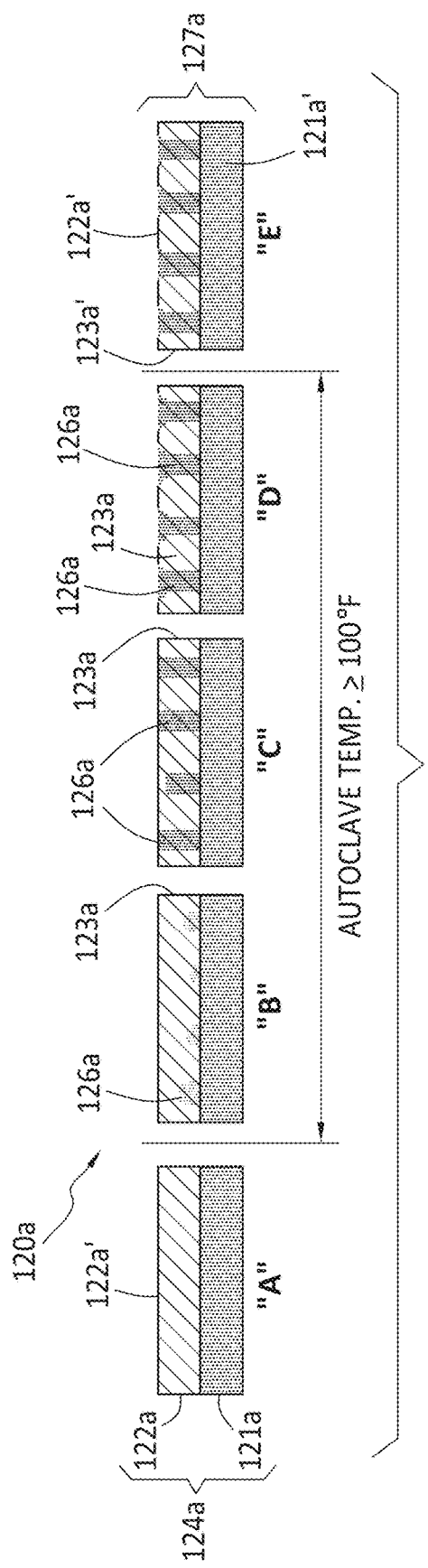
Figure 12B:
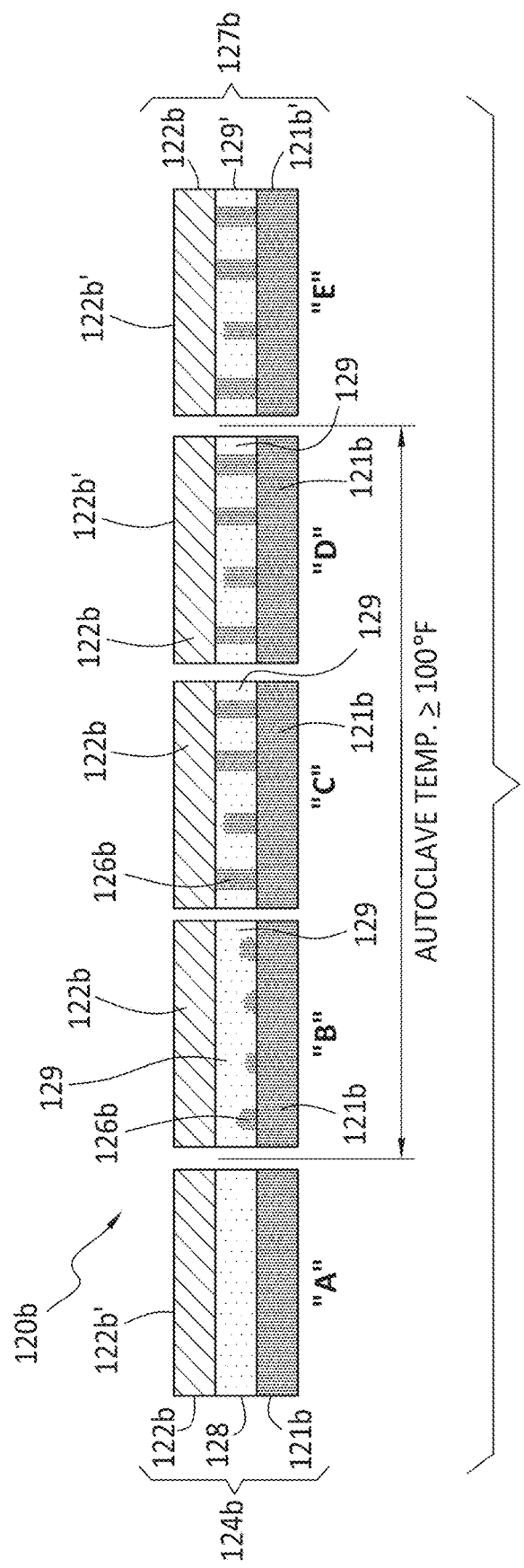

Having thus described variations of the disclosure in general terms, reference will now be made to the accompanying non-limiting drawings, which are not necessarily drawn to scale, and wherein:

FIG. 1 is a non-limiting illustration of a co-curable and a co-cured epoxy-based composite material including a co-curable and co-cured surfacing film that is further co-cured with a co-curable polyurethane-based coating material coating the surfacing film, according to a present aspect;

FIG. 2 is a non-limiting illustration of system of curing a co-curable and a co-cured epoxy-based composite material including a co-curable and co-cured surfacing film that is further co-cured with a co-curable polyurethane-based coating material coating the surfacing film, according to a present aspect;

FIG. 3 is a non-limiting illustration of a co-cured epoxy-based composite material including a co-cured surfacing film that is coated with a co-cured polyurethane-based coating material, according to a present aspect;

FIG. 4 is a non-limiting illustration of a vehicle in the form of an aircraft n aircraft incorporating a painted co-cured epoxy resin-containing material according to present aspects;

FIG. 5 is a non-limiting illustration of a "decorative" paint stack for an epoxy-based composite material according to a present aspect;

FIG. 6 is a non-limiting illustration of a coated co-curable epoxy resin-containing material incorporating a tack layer, according to a present aspect;

FIG. 7 is a non-limiting illustration of a coated co-curable epoxy resin-containing material incorporating a tack layer, according to a present aspect;

FIG. 8 is a flowchart outlining a method according to a present aspect;

FIG. 9 is a flowchart outlining a method according to a present aspect;

FIG. 10A is a 150× magnification view of a cross section of a co-cured epoxy resin-containing structure showing, for comparison, pooling of composite resin pooling at the surfacing film layer in a co-cured epoxy resin-containing material film stack;

FIG. 10B is a 150× magnification view of a cross section of a co-cured epoxy resin-containing structure showing no channeling of epoxy resin-containing composite resin pooling at a MB 1515 surfacing layer film in a co-cured material stack, according to a present aspect;

FIG. 11A is a 150× magnification view of a cross-section of a co-cured epoxy resin-containing structure showing, for comparison, a lack of uniform thickness of the surfacing film;

FIG. 11B is a 150× magnification view of a cross section of a co-cured epoxy resin-containing structure showing substantially uniform thickness of a MB 1515 surfacing layer film;

FIG. 12A is a cross-sectional representative view outlining epoxy resin migration during curing; and FIG. 12B is a cross-sectional representative view outlining the blocking of epoxy resin migration during curing, according to present aspects;

DETAILED DESCRIPTION

According to presently disclosed aspects, a co-curable polyurethane-based coating that includes a UV-inhibiting agent and a curing control agent is used to form a co-curable polyurethane-based coating that is used to coat a co-curable epoxy-based material including, for example, a co-curable epoxy-based composite material for the purpose of, in a single coating layer, imparting to the co-curable epoxy-based material enhanced UV protection; and enhanced resistivity to chemical degradation caused, for example, by paint stripping agents and paint rework procedures.

Further aspects include applying a co-curable epoxy-based surfacing material layer to a co-curable epoxy-based composite material and applying a co-curable polyurethane-based coating material layer to the co-curable epoxy-based adhesive surfacing material layer, and co-curing the three materials at a co-curing temperature to form a polyurethane-coated epoxy-based composite structure with improved UV resistance and an polyurethane-coated epoxy-based composite structure with improved resistance to paint stripping agents and paint stripping processes. According to present aspects, the final co-cured polyurethane-coated epoxy-based composite structure has superior color retention after multiple autoclave cures compared to typical painted composite materials. In addition, the improved surfacing material, according to present aspects, controls and/or blocks the co-cured composite material and the co-cured coating (such as a polyurethane) from flowing or channeling through layers of the composite film. The co-cured epoxy-based adhesive surfacing material layer is equivalently referred to herein as an intermediate layer and/or an adhesive layer, and/or a surfacing layer, and the surfacing layer creates a barrier between the composite substrate and the co-cured film (or polyurethane outer coating).

If desired, the presently disclosed single layer co-curable polyurethane-based coating material can be made into, for example, a co-curable polyurethane-based coating film that can be applied with precision and ease onto co-curable epoxy-based composite materials, for example, for the purpose of enhancing coating material uniformity. In other words, according to present aspects, the presently disclosed co-curable polyurethane-based coating material made into the form of a coating film can possess a substantially constant average coating thickness that can be preselected, and better controlled along its applied area, than can be, for example, a liquid coating or paint that is brushed, sprayed, or into which a component or part is dipped, etc.

The co-curable polyurethane-based film coating material layer and/or the epoxy-based adhesive surfacing material layer, according to present aspects, can be manufactured and stored in rolls for later use, and the dispensed, for example, from a rolled or other desired orientation to facilitate storage, use, etc., (as compared to, for example, a sprayed liquid paint or other sprayed coating material) thereby increasing uniformity, accuracy, ease of application, etc., and reducing the overall weight of a final polyurethane-coated co-cured epoxy-based composite structure comprising the co-cured polyurethane-based coating film and the co-cured epoxy-based adhesive surfacing layer film. With respect to the co-curable polyurethane-coated epoxy resin-containing product and the final co-cured polyurethane-coated epoxy resin-containing product produced according to presently disclosed methods, the terms co-curable and co-cured polyurethane-coated epoxy-based "structure" and co-curable and co-cured polyurethane-coated epoxy-based "material" are used equivalently and interchangeably.

In addition, the disclosed co-cured polyurethane-based coatings can have an electrical resistivity of at least about 1000 kΩ, or the co-curable polyurethane-based coatings can be doped with conductive material to achieve a desired electrical resistivity (or electrical conductivity, etc.).

In addition, the presently disclosed co-curable polyurethane-based coatings display an adhesion capability to facilitate the bonding topcoats, sealants, etc. to the co-cured polyurethane-based coatings and films.

According to present aspects, the use of a tailored, single-layer of co-curable polyurethane-based material coating to coat a co-curable epoxy-based composite material obviates the need for several separate coating layers applied to treat an epoxy-based composite material.

During the fabrication of composite parts, including epoxy-based composite parts, epoxy-based composite material surfaces can begin to oxidize at the composite material surface due to exposure to ambient ultraviolet (UV) radiation. To avoid a change in surface characteristic of a composite material that can be caused, at least in part by composite material exposure to UV radiation, epoxy-based composite material surfaces are often coated with a primer layer, with the primer containing, for example, a UV "blocking" agent. However, applying UV mitigation, or "blocking" agents to composite surfaces often adds manufacturing complexity in the form of at least, increasing manufacturing time, increasing rework time, increasing overall production cost, etc., as such applied UV blocking material layers typically are removed from the composite material before additional composite material processing is conducted. In addition such primer layers are often treated to accommodate a subsequent paint layer or topcoat. This treatment of individual subsequent layers added to an epoxy-based composite material again leads to increased manufacturing time, increased rework time, increased overall production cost, etc.

FIG. 1 is an illustration of a co-curable coated epoxy-based composite material, coated with co-curable material layers, according to present aspects. As shown in FIG. 1, a coated co-curable coated epoxy-based composite structure 10 includes a co-curable epoxy-based adhesive surfacing material layer 14 disposed onto a co-curable epoxy-based composite material 12. FIG. 1 further shows a co-curable polyurethane-based coating material 16 disposed onto the co-curable epoxy-based adhesive surfacing material layer 14.

According to present aspects, the co-curable epoxy-based composite material can be fiber-reinforced epoxy-resin-based composite materials including, for example, carbon fiber-, boron fiber-, glass fiber-, aramid fiber-containing, etc., reinforced epoxy resin-based composite materials, including those used in the manufacture of large objects including, for example, vehicles, etc., including, for example, manned and unmanned aircraft, manned and unmanned spacecraft, manned and unmanned rotorcraft, manned and unmanned hovercraft, manned and unmanned terrestrial vehicles, manned and unmanned waterborne surface vehicles, manned and unmanned waterborne sub-surface vehicles, manned and unmanned satellites, and the like, and combinations thereof.

Surfacing Material

According to further aspects, the co-curable epoxy-based adhesive surfacing material layer, also referred to equivalently herein as the intermediate layer, can include adhesive surfacing material comprising an amount of an epoxy-based material having a curing temperature ranging from about 250° F. to about 400° F., a Tg ranging from about 300° F. to about 450° F., or from about 320° F. to about 450° F., or from about 320° F. to about 400° F., or from about 300° F. to about 400° F., or from about 330° F. to about 350° F., and a gel time ranging from about 5 mins. to about 20 mins. when held at a temperature of ranging from about 240° F. to about 260° F.

In a further aspect, the co-curable epoxy-based adhesive surfacing material layer, in a co-cured state can comprise a chemical resistivity to paint stripping agents as measured by having a pencil hardness value according to ASTM D 3363-05(2011)e2 of at least HB or higher after 48 hours of exposure to direct exposure of a benzyl alcohol-based paint stripping agent.

In another aspect, the co-curable epoxy-based adhesive surfacing material layer, in a co-cured state can resist discoloration when exposed to UV radiation wavelengths ranging from about 200 nm to about 800 nm. Non-limiting commercial materials satisfying the aforementioned characteristics to serve as a co-curable epoxy-based adhesive surfacing material layer are sold commercially under the name, Metlbond™ 1515, (Cytec Solvay Group), FM309-1 film adhesive (Cytec Solvay Group), SM905 film adhesive (Cytec Solvay Group), Scotch Weld™ AF525 film adhesive (3M™), etc.

Polyurethane Coating

In further aspects, the polyurethane-based coating material, also referred to equivalently herein as the outer layer, outer coating, outer material, or the like, can also possess a chemical resistance that is robust enough to resist chemical attack from chemical paint stripping agents and other stripping processes. In this way, and according to present aspects, the co-cured polyurethane-based coating material not only serves to protect the underlying co-cured epoxy-based composite material from UV degradation by blocking UV radiation, but also protects the underlying co-cured epoxy-based composite material from degradation due to paint stripping procedures as infiltration into the epoxy composite material is prevented by the co-cured polyurethane-based coating material.

According to further aspects, the polyurethane-based coating material layer can include a polyurethane-based material that comprises a UV radiation transmissivity value of 0% for UV wavelengths ranging from about 200 nm to about 800 nm when the co-cured polyurethane-based coating material layer comprises an average layer thickness ranging from about 2 mils to about 3 mils. Still further, according to present aspects, the co-curable epoxy-based adhesive surfacing material layer begins to cure at about 150° F. (and at a temperature lower than the curing temperature of the co-curable epoxy-based composite material), and has a curing range over a temperature range, ranging from about 150° F. to about 400° F., or from about 150° F. to about 350° F., or from about 250° F. to about 400° F.

In another aspect, the co-cured polyurethane-based coating material layer can be manufactured into, and can be applied as a film layer, preferably a film layer having an average film thickness ranging from about 1 mil to about 45 mils, or from about 1 to about 20 mils, or from about 2 to about 5 mils, or from about 2 to about 3 mils. In another aspect, a polyurethane-based coating material layer has a Tg ranging from about 0° F. to about 200° F.

In further aspects, in the co-curable epoxy-based composite material, the co-cured epoxy-based composite material, the co-cured epoxy-based adhesive material, and the co-cured polyurethane-based coating material are co-cured at a temperature ranging from about 250° F. to about 350° F.

Composite

The composite material layer, also referred to equivalently herein as the base layer or the underlayer, can be a co-curable epoxy-based material. In present aspects, the co-cured epoxy-based composite material, the co-cured epoxy-based adhesive surfacing material, and the co-cured polyurethane-based coating material layer are co-cured at a temperature ranging from about 250° F. to about 350° F.

In addition, the robustness of the presently disclosed co-cured polyurethane-based coatings that are co-cured onto co-cured epoxy-based composite materials endure subsequent and repeated autoclaving that may be required during subsequent and repeated repainting protocols. That is, unlike some currently required repainting protocols, the presently described co-cured polyurethane-based coatings need not be replaced, removed or otherwise reapplied during repainting and repeated autoclaving. That is, present aspects contemplate the removal or reconditioning of only the layers coated atop the present co-cured polyurethane-based layers (e.g., topcoat layers, basecoat layers, clearcoat layers, intermediate coating layers, etc.).

FIG. 2 is an illustration showing the coated co-curable coated epoxy-based composite structure 10 at various stages during a co-curing regimen for the purpose of forming a co-cured epoxy-based composite material according to present aspects. As shown in FIG. 2, a coated co-curable coated epoxy-based composite structure 10 (as shown in FIG. 1) is schematically shown proceeding through a predetermined co-curing regimen for the purpose of co-curing the constituent layer of the co-curable coated epoxy-based composite structure 10; including the co-curing of the co-curable epoxy-based adhesive surfacing material layer 14, the co-curing of the co-curable epoxy-based composite material 12, and the co-curing of the co-curable polyurethane-based coating material 16 disposed onto the co-curable epoxy-based adhesive surfacing material layer 14.

As further shown in FIG. 2, at stage "A", the coated co-curable coated epoxy-based composite structure 10 is subjected to heating, such as, for example, heating provided via an autoclave. As shown in stages "A", "B", and "C", of FIG. 2, as the temperature increases from room temperature to a temperature of about 100° F., if epoxy resin from the epoxy-based composite material 12 migrates from the co-curable epoxy-based composite material 12 into the co-curable epoxy-based adhesive surfacing layer 14 (e.g., that can be a co-curable epoxy-based adhesive surfacing film layer), the epoxy resin from the epoxy-based composite material 12 does not further migrate into the co-curable polyurethane-based coating material 16. While not being bound to any particular theory, it is believed that, as the co-curable epoxy-based adhesive surfacing layer 14 begins to cure at a temperature that is lower than the curing temperature of the co-curable epoxy-based composite material 12, any small amount of epoxy-resin that migrates from the co-curable epoxy-based composite material 12 into the co-curable epoxy-based adhesive surfacing layer 14 becomes bound into a miscible layer. Such a miscible layer formed in the co-curing and co-curable epoxy-based adhesive surfacing layer 14 (of FIG. 1) is represented in FIG. 2 in stages "A", "B", and "C" as layer 14a, 14b, and 14c respectively (and that can be a "film" layer). As the curing temperature provided by the predetermined curing regimen (e.g., the autoclave temperature) continues to rise to about 250° F., as shown in stage "D" of FIG. 2, the co-curable epoxy-based adhesive surfacing layer 14, the epoxy resin from the epoxy-based composite material 12 and the co-curable polyurethane-based coating material 16 co-cure to form the co-cured polyurethane-coated epoxy-based composite structure 10a.

When used as a coating layer in an epoxy composite material painting or coating regimen, the advantages are imparted by the presently disclosed co-curable polyurethane-based coating layer at least to the underlying epoxy-based composite material as well as to the final co-cured polyurethane-coated epoxy-based composite structure. According to present aspects, such imparted advantages include, without limitation, the UV protection of the epoxy-based composite material, the UV protection of the epoxy-based adhesive surfacing layer, the chemical resistance of paint stripping agents and paint stripping procedures, etc.

Since composite materials often "outlast" decorative and/or non-decorative paint and other coating layers during the life or service of a component or object that comprises the epoxy-based composite material, such composite material can be subjected to, for example, re-painting, or reworking where, for example, the stripping of paint layers (e.g., clearcoat, basecoat, topcoat, etc.,) and the required resurfacing of the cured epoxy-based composite material surfacing film may be required.

In addition, according to present aspects, the robustness of the polyurethane-based coating material alone, or in concert with the epoxy-based adhesive surfacing film, protect the co-cured epoxy-based composite material from the typically incurred UV deterioration that can be evidenced through, among other things, discoloration of the epoxy-based composite material. For example, according to present aspects, through the use of the presently disclosed co-curable polyurethane-based coating layer, a significant number of procedural steps that are otherwise and have previously been required during re-painting or reworking a composite material substrate are obviated; resulting in a substantial reduction in resources including, for example, material cost for replacing UV-damaged layers, manpower hours previously required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.).

FIG. 3 illustrates present aspects showing a co-cured polyurethane-coated epoxy-based composite structure that is being subjected to a paint stripping protocol. As shown in FIG. 3, at stages "A" and "B", and according to further present aspects, the swelled outer surface 18, 18a, respectively, of the co-cured polyurethane-based coating material layer 16 affords additional protection to the co-cured epoxy-based adhesive surfacing layer 14d (and the underlying co-curable epoxy-based composite material 12, that is now co-cured). As shown in FIG. 3 in stages "A" and "B", the swelled outer surface (18, 18a) of the co-cured polyurethane-based coating material 16 (of the co-cured polyurethane-coated epoxy-based composite structure 20) progressively expands outwardly, or "swells", in the presence of a paint-stripping agent or resurfacing agent, such as, for example, a benzyl alcohol-based paint stripping agent, etc.

FIG. 3, stage "C", shows a co-cured epoxy-based composite material after the paint stripping protocol shown in FIG. 3, stages "A" and "B" has been conducted. As shown in FIG. 3, stage "C", after a paint stripping process has been conducted, a post-processed co-cured polyurethane-coated epoxy-based composite structure 20a comprises a co-cured polyurethane-based coating material layer 16 where the previously swelled outer surface 18, 18a are no longer in a swelled orientation.

FIG. 4 is a non-limiting illustration of a vehicle 40, in the form of an aircraft that contains components, assemblies and sub-assemblies that can comprise the co-cured polyurethane coated epoxy-based composite material according to present aspects. As shown in FIG. 4, vehicle 40 includes surfaces, and surface assemblies and sub-assemblies than can incorporate co-curable and co-cured epoxy-based composite materials that can be coated with the presently disclosed co-curable and co-curable polyurethane-based coating materials. As shown in FIG. 4, vehicle 40 includes a fuselage 41 including a fuselage section 42; wing 43 including wing section 44; tail/vertical stabilizer 45 including tail/vertical stabilizer section 46. The co-curable and co-cured polyurethane-based coating materials and the co-curable and co-cured epoxy-based composite materials coated with the co-curable and co-cured polyurethane-based coating materials can be used in the manufacture of the components, assemblies, sub-assemblies, etc., at least including those shown in FIG. 4.

FIG. 5 is a non-limiting illustration of an orientation of material layers according to present aspects, that include paint layers and coatings that can used on composite and other substrate materials such as, for example, on vehicles, including, for example, aircraft, including aircraft of the type illustrated in FIG. 4.

FIG. 5 shows, a representative and non-limiting cross-sectional view of a contemplated co-cured polyurethane-coated epoxy-based composite material with decorative paint stack 50 in an arrangement that includes coating layers disposed onto a co-cured polyurethane-coated epoxy-based composite material (such as the co-cured polyurethane-coated epoxy-based composite material that is shown in FIG. 2 as 10a, and the co-cured polyurethane-coated epoxy-based composite material as shown in FIG. 3 as 20a). As shown in FIG. 5, a co-cured epoxy-based adhesive surfacing material layer 54 is co-cured onto a co-cured epoxy-based composite material 52. FIG. 5 further shows a co-cured polyurethane-based coating material layer 56 co-cured onto the co-cured epoxy-based adhesive surfacing material layer 54. The paint coating "stack" 50 as shown in FIG. 5, further includes an intermediate strippable coating layer 57 disposed onto the co-cured polyurethane-based coating material layer 56, with a basecoat layer 58 disposed onto the intermediate strippable coating layer 57, followed by a clearcoat layer 59 disposed onto the basecoat layer 58. According to one present aspect, the intermediate strippable coating layer 57 as well as the basecoat layer 58 and/or the clearcoat layer 59 can be applied after the co-curing of the epoxy-based composite material, the epoxy-based surfacing material and the polyurethane-based coating material layers.

As shown in FIG. 5, the intermediate strippable coating layer 57 is shown deposited onto or otherwise applied to the co-cured polyurethane-based coating material layer 56 to form a co-cured polyurethane-coated epoxy-based composite material with strippable intermediate strippable coating layer 57. The intermediate strippable coating layer 57 is a selectively strippable layer that assists in the removal of subsequently deposited coating layers (e.g., the coatings and coating layers to be subsequently deposited onto the strippable intermediate coating layer, such as, for example, various topcoat layers, clearcoat layers, etc., shown in FIG. 5 as the basecoat layer 58 and the clearcoat layer 59) that are collectively and equivalently referred to herein as "paint layers".

Painted objects comprising composite substrate materials can be designed and engineered such that the composite material has a useful life that "outlasts" decorative or non-decorative paint coating layers applied to the composite materials. Accordingly, the strippable intermediate coating can facilitate the removal of subsequently deposited paint layers by allowing such subsequently deposited paint layers (e.g. basecoat layers, topcoat layers, etc.) to be removed or "stripped" from a paint stack, without allowing the stripping chemicals and stripping processes to remove layers beneath the strippable intermediate coating layer.

FIG. 6 is a cross-sectional view of a co-cured epoxy-based composite material with non-decorative paint stack 60 including co-curable epoxy-based composite material layer 52, the co-curable epoxy-based adhesive surfacing material layer 54 and the polyurethane-based coating material layer 56 as shown in FIG. 5. As shown in FIG. 6, a co-cured epoxy-based adhesive surfacing material layer 54 disposed onto a co-cured epoxy-based composite material 52. FIG. 6 further shows a co-cured polyurethane-based coating material layer 56 disposed onto the co-cured epoxy-based adhesive surfacing material layer 54. In another aspect, if layers 57, 58 and 59 are formed from curable materials and capable of curing at temperatures compatible with the cure of the underlying co-curable epoxy-based layers (i.e., the co-curable epoxy-based composite material layer 52, the co-curable epoxy-based adhesive surfacing material layer 54) and the curable polyurethane-based coating material layer 56, the entirety of the layers shown in FIG. 5 (e.g., layers 52-59) can be co-cured together.

FIG. 7, according to present aspects, shows a cross-sectional view of a material stack comprising a presently disclosed co-cured polyurethane-coated epoxy-based composite structure 70 similar to that shown in FIG. 6, but also including a tack layer 72 introduced between the layers and/or onto on or more of: 1) the co-curable epoxy-based surfacing layer 74; and/or 2) the polyurethane-based coating material layer 76 to respectively form: 1) the co-curable epoxy-based surfacing layer+tack layer 74; and/or 2) the polyurethane-based coating material layer+tack layer 76, as shown in FIG. 7. In another aspect, although not shown, tack layer 72 can be additionally applied to the epoxy-based composite material 52.

The tack layer 72 introduced to the stack shown in FIG. 7 can be useful if, for example, a composite substrate material 52 (onto, which a surfacing material and paint film layers are to be applied; shown in FIG. 6 and FIG. 5, respectively) is located in an area of a composite substrate material that is difficult to access, or the area has a geometry or location where gravitational forces present difficulty in orienting and maintaining the position of an additional coating layer (e.g., a coating layer or layers that can be in the form of a film). In such circumstances the "tackiness" of a film layer or combined film layers may not possess an adequate "tack" to afford the film layer or layers enough adhesion to facilitate placement and/or installation and/or co-curing of the film layer or layers with the composite substrate material.

Such difficult substrate material areas on a structure (e.g., an aircraft, etc.) having geometry or locations where gravitational forces present difficulty in orienting and maintaining the position of an additional coating layer include, for example, the underside of a structure, or structures comprising an area having both a horizontal and vertical region, substrates having a complex contour, etc., including areas on the underside of structures where gravitation forces could frustrate the ability to naturally "drape" over a contour, or other surface geometry, etc., without sustaining wrinkling, creasing, gapping, reverse-folding, etc.

According to further aspects, the co-curable polyurethane-based coating materials can further comprise tack characteristics that facilitate their application onto complex surfaces, including surfaces having complex geometries, including contours, as well as facilitate the application, placement, intermediate and/or final placement, etc. of such co-curable polyurethane-based coating materials in difficult to access regions including, for example, the underside or structures where gravitation forces could frustrate the ability to naturally "drape" over a contour, or other surface geometry, etc., without sustaining wrinkling, creasing, gapping, reverse-folding, etc.

According to present aspects, and for purposes of the present application tack is understood to be a degree of adhesion adequate to maintain, or hold, a material in place, with the degree of adhesion potentially being such that the material can be removable a plurality of times to facilitate final placement at a desired application location, for example, on a larger component or object such as, for example, an location on an aircraft or aircraft assembly or sub-assembly.

While the co-curable polyurethane-based coating material in film form can be fabricated to possess a predetermined tack value, such films can also be treated with a tack material layer. Suitable tack material layers, can be provided to the co-curable polyurethane-based coating material films in a form as desired such as, for example, spray form, film form, etc. Non-limiting examples of tack material layers compatible with the presently disclosed co-curable polyurethane-based coating materials include, for example, pressure-sensitive adhesive materials including, for example, a pressure-sensitive epoxy material adhesive, a pressure-sensitive acrylic material adhesive, a pressure-sensitive polyurethane adhesive material, etc.

FIG. 8 is a flowchart outlining a non-limiting method 100 according to present aspects including applying 102 a co-curable epoxy-based adhesive surfacing material layer to a co-curable epoxy-based composite material, applying 104 a co-curable polyurethane-coating material layer to the co-curable epoxy-based adhesive surfacing material layer to form a co-curable polyurethane-coated epoxy-based composite material, and co-curing 106 the co-curable polyurethane-coated epoxy-based composite material to form a co-cured polyurethane-coated epoxy-based composite material. Optionally, the method outlined in FIG. 8 can include applying 108 a tack layer comprising a tack material to one or more of the co-curable epoxy-based adhesive surfacing material layer, and/or to the co-curable polyurethane-based coating material layer, (and although not shown, to the co-curable epoxy-based composite material) to facilitate orienting, position, and maintaining the various layers in place prior to co-curing the layers and the polyurethane-coated epoxy-based composite material.

FIG. 9 is a flowchart outlining a non-limiting method 200 according to present aspects including applying 102 a co-curable epoxy-based adhesive surfacing material layer to a co-curable epoxy-based composite material, applying 104 a co-curable polyurethane-coating material layer to the co-curable epoxy-based adhesive surfacing material layer to form a co-curable polyurethane-coated epoxy-based composite material, and co-curing 106 the co-curable polyurethane-coated epoxy-based composite material to form a co-cured polyurethane-coated epoxy-based composite material. As shown in FIG. 9, during co-curing, the method 200 further includes forming 110 a miscible layer of epoxy-based material formed from mixing or intermingling an amount of epoxy-based material from the epoxy-based composite material with an amount of epoxy-based material from the epoxy-based surfacing film layer. Optionally, the method outlined in FIG. 9 can include applying 108 a tack layer comprising a tack material to one or more of the co-curable epoxy-based composite material and/or to the co-curable epoxy-based adhesive surfacing material layer, and/or to the co-curable polyurethane-based coating material layer, to facilitate orienting, position, and maintaining the various layers in place prior to co-curing the layers.

According to further aspects, the co-cured polyurethane-based coating material possesses a chemical resistance that is robust enough to resist chemical attack from chemical paint stripping agents and other stripping processes. In this way, and according to present aspects, the co-cured polyurethane-based coating material not only serves to protect the underlying co-cured epoxy-based composite material from UV degradation by blocking UV radiation, but also protects the underlying co-cured epoxy-based composite material from degradation due to paint stripping procedures as infiltration into the epoxy composite material is prevented by the co-cured polyurethane-based coating material. According to present aspects, the co-cured polyurethane-coated epoxy-based composite material has a UV transmittance value of 0% for UV wavelengths ranging from about 200 nm to about 800 nm when the co-curable polyurethane-based coating material layer comprises an average layer thickness ranging from at least about 2 mils to about 3 mils, or greater.

In addition, the robustness of the presently disclosed co-cured polyurethane-based coatings that are co-cured onto co-cured epoxy-based composite materials endure subsequent and repeated autoclaving that may be required during subsequent and repeated repainting protocols. That is, unlike some currently required repainting protocols, the presently described co-cured polyurethane-based coatings need not be replaced, removed or otherwise reapplied during repainting and repeated autoclaving, as presents aspects contemplate the removal or reconditioning of only the layers coated atop the present co-cured polyurethane-based layers (e.g., topcoat layers, basecoat layers, clearcoat layers, intermediate coating layers, etc.).

In addition to enduring the harsh conditions of repeated autoclaving, such as those conditions incurred by subsequent surface painting of composite substrates, as discussed above, the presently disclosed co-curable and co-cured polyurethane-based coatings resist the typical degradation that coating layers incur as a result of exposure to paint stripping agents used during repainting and resurfacing protocols over the useful life of coated composite substrates. That is, typical composite material repainting protocols call for at least one or more of the obviated layers to be stripped from the coating layer "stack". For example, according to typical methods, while the obviated surfacing film layer may resist chemical paint strippers for the purpose of protecting the epoxy-based composite material, some degree of surfacing film may be stripped away from the coating stack, along with the spray surfacer layer and the primer layer. In contrast to typical operations, and according to present aspects, the co-cured and co-curable polyurethane-based coatings act as surfacing film, spray surfacer, and primer, and further display a resistance to chemical strippers, such that the presently disclosed polyurethane coating will not be stripped from the coating stack during the resurfacing/stripping that occurs prior to repainting. The chemical resistance of the presently disclosed co-cured polyurethane-based coatings was measured by ASTM D3363, and ranges from about H to about 6H.

Chemical agents incompatible with paints or other coating materials and that can soften, or otherwise controllably destroy and find use as paint stripping agent include, for example, phosphate ester hydraulic fluids, benzyl alcohol, terpene, etc. The presently disclosed co-cured polyurethane-based coating materials are formulated to possess a chemical resistance to chemical agents useful as paint stripping agents. For example, presently disclosed co-cured polyurethane-based coating materials were exposed to Bonderite S-ST 1270-6 Aero™ (also known as Turco 1270-6™) (Henkel Adhesives) for up to 48 hours without visible pinholes in the surface observed. In other testing the present co-cured polyurethane-based coating materials displayed chemical resistance values ranging from at least about HB to about 2H.

The curable and cured polyurethane-based coating materials and the curable and cured epoxy-based composite materials coated with the curable and cured polyurethane-based coating materials can be used in the manufacture of components, assemblies, sub-assemblies, etc., and in larger objects including stationary objects and or vehicle incorporating the components, assemblies, sub-assemblies, etc. Larger stationary objects include, for example, buildings, bridges, trusses, etc. Larger vehicles include, for example, manned and unmanned aircraft, manned and unmanned spacecraft, manned and unmanned rotorcraft, manned and unmanned hovercraft, manned and unmanned terrestrial vehicles, manned and unmanned waterborne surface vehicles, manned and unmanned waterborne sub-surface vehicles, manned and unmanned satellites, and the like, and combinations thereof.

FIGS. 10A and 10B are cross-sectional photographs (taken at 150× magnification). FIG. 10A shows a cross-sectional view of a co-cured polyurethane-coated epoxy-based structure 80a including a co-cured surfacing material layer 82a onto which (before co-curing) a polyurethane-coating material layer 81a had been deposited. As is visible in the FIG. 10A photograph, composite material has "pooled" into regions between the surfacing material layer 82a and the polyurethane-based coating material layer 81a.

In contrast to the polyurethane-coated epoxy-based structure 80a shown in FIG. 10A, FIG. 10B shows co-cured composite structure, according to present aspects. FIG. 10B shows a cross-sectional view of a co-cured polyurethane-coated epoxy-based structure 80b including a co-cured surfacing material layer 82b onto which (before co-curing) a polyurethane-coating material layer 81b had been deposited. As is visible in the FIG. 10B photograph, the composite material layered beneath the epoxy-based surfacing layer 82b has remained below the epoxy-based surfacing layer 82b and has not migrated to a position between the epoxy-based adhesive surfacing material and the polyurethane-based coating material 81b (as is the case illustrated in FIG. 10A). According to a present aspect, the co-cured polyurethane-coated epoxy-based structure 80b includes an amount of Metlbond 1515 as the co-curable and co-cured epoxy-based adhesive surfacing material layer 82a.

FIGS. 11A and 11B are cross-sectional photographs (taken at 150× magnification). FIG. 11A shows a cross-sectional view of a co-cured polyurethane-coated epoxy-based structure 90a including a co-cured epoxy-based adhesive surfacing material layer 92a onto which (before co-curing) a polyurethane-coating material layer 91a had been deposited. As is visible in the FIG. 11A photograph, the polyurethane-based coating material layer 91a appears as a non-uniform layer. While being bound to no particular theory, it is believed that the epoxy-based adhesive surfacing material layer 92a has failed to suppress the incursion of underlying epoxy-based material from the surfacing layer (or from an underling composite material under the epoxy-based surfacing layer onto which the epoxy-based surfacing layer has been applied and that is co-cured with the other layers present).

In contrast to the polyurethane-coated epoxy-based structure 90a shown in FIG. 11A, FIG. 11B shows co-cured composite structure, according to present aspects. FIG. 11B shows a cross-sectional view of a co-cured polyurethane-coated epoxy-based structure 90b including a co-cured epoxy-based adhesive surfacing material layer 92b onto which (before co-curing) a polyurethane-coating material layer 91b had been deposited, followed by depositing a paint stack layer. As is visible in the FIG. 11B photograph, the polyurethane-based coating material layer 91b appears as a substantially uniform layer (in strong contrast to the co-cured polyurethane-coated epoxy-based structure shown in FIG. 11A). According to a present aspect, the co-cured polyurethane-coated epoxy-based structure 90b includes an amount of Metlbond 1515 as the co-curable and co-cured epoxy-based adhesive surfacing material layer 92b.

Regarding the ability of the presently disclosed co-cured polyurethane-coated epoxy-based composite structures and their ability to retain color (not suffer discoloration to a typical degree for epoxy-based composite materials), it has now been determined particularly useful epoxy-based adhesive surfacing material layers possess certain characteristics, including: epoxy-based adhesive surfacing material layers co-curable at a temperature ranging from about 150° F. to about 350° F., and further comprising a Tg ranging from about 300° F. to about 450° F., or comprising a Tg ranging from about 320° F. to about 400° F., or comprising a Tg ranging from about 330° F. to about 350° F., and a gel time ranging from about 5 to about 20 minutes when held at a temperature ranging from about 240° F. to about 260° F. It has now been further determined that co-curable epoxy-based adhesive surfacing materials having these properties include, for example, those sold commercially under the name, Metlbond™ 1515, (Cytec Solvay Group), FM309-1 film adhesive (Cytec Solvay Group), SM905 film adhesive (Cytec Solvay Group), Scotch Weld™ AF525 film adhesive (3M™), etc.

While not being bound to or limited by any particular theory or explanation, FIGS. 12A and 12B further illustrate a mechanism that is believed to occur during the curing of composite material painted surfaces, and that is believed to contribute to, or otherwise impact, the rate of UV discoloration of composite materials. As shown in FIG. 12A, a curing regimen for a painted epoxy-based composite material (that does not have the co-curable epoxy-based adhesive surfacing film incorporated into the co-curable composite structure) comprises a paint stack is shown progressing through stages "A", "B", "C", "D" of FIG. 12A. FIG. 12A, step "A" shows a curing cycle for a curable composite material 124a comprising an epoxy-based composite material 121a with a paint stack 122a applied thereto. The steps "B', "C", and "D" of FIG. 12A illustrate the migration of composite material into the paint stack during curing at an autoclave temperature greater than or approximately equal to 100° F.

As shown in FIG. 12A, in step "B" an amount of migrating epoxy-based material 126a from the composite material 121a (shown as shaded areas) begins to expand into, migrate into, or otherwise encroaches in an upward direction into the paint stack 122a.

As shown in step "C" of FIG. 12A, the migration amounts of migrating epoxy-based material 126a from the epoxy-based composite material 121a (shown as shaded areas) continue to migrate toward the paint layer exterior surface 122a' of paint stack 122a.

As shown in step "D" of FIG. 12A, migration amounts of migrating epoxy-based material 126a from the composite material 121a (shown as shaded areas) continue to migrate toward, and may extend to or through, areas of the paint layer exterior surface 122a of paint layer 123 a.

FIG. 12A, step "E" represents a cured epoxy-based composite material structure 127a (e.g. a final cured product) comprising the paint stack 123a and the cured epoxy-based composite material 121a' showing amounts of epoxy-based composite material 126a remaining in the paint stack 123a. As shown in step "E" of FIG. 12A, such epoxy-based composite material 126a, appears to partially interrupt an otherwise homogeneous paint stack exterior surface 122a' by extending through the paint stack exterior surface 122a'.

In strong contrast to FIG. 12A, FIG. 12B illustrates mechanisms for a co-curing regimen with the incorporation of an epoxy-based adhesive surfacing layer, according to present aspects, that are believed contribute to improved UV resistance and improved resistance to composite material discoloration (in addition to other improvements), due to the incorporation of a co-cured epoxy-based adhesive surfacing layer between the composite material and the paint layer stack.

As shown in FIG. 12B, a curing regimen for an epoxy-based composite material (that has a co-curable epoxy-based adhesive surfacing film incorporated into the co-curable composite structure and) that comprises a paint stack is shown progressing through stages "A", "B", "C", "D" of FIG. 12B. The steps "B', "C", and "D" of FIG. 12B illustrate the potential for a migration of composite material out of the curable epoxy-based composite material during curing at an autoclave temperature greater than or approximately equal to 100° F. FIG. 12B, step "A" shows a co-curable composite material structure 124b comprising a co-curable epoxy-based composite material 121b with a co-curable epoxy-based adhesive surfacing material layer 128 oriented between the co-curable composite material structure 124b and a paint stack 122b (that, if desired, can be co-curable).

As shown in FIG. 12B, step "B" an amount of migrating epoxy-based material 126b from the composite material 121b (shown as shaded areas) begins to expand into or otherwise encroaches in an upward direction into the epoxy-based adhesive surfacing material 128 to form a mixed surfacing layer 129 that can comprise amounts of the migrating composite material 126b into the epoxy-based adhesive surfacing material layer 128.

As shown in steps "C" and "D" of FIG. 12B, the migration amounts of migrating epoxy-based material 126b from the composite material 121b (shown as shaded areas) may continue to migrate into the mixed surfacing layer 129 through the co-curing regimen until, as shown in step "E" of FIG. 12B, a co-cured epoxy-based composite material structure 127b (e.g., a final co-cured epoxy-based composite material structure product) is achieved comprising a co-cured paint stack 122b and a co-cured epoxy-based composite material 121b' along with a co-cured mixed surfacing layer 129'.

As shown in steps "C", "D", and "E" of FIG. 12B, no amounts of migrating epoxy-based materials from the co-curable and co-curing composite material significantly (if at all) encroach into the paint stack 122b, and the paint stack exterior surface 122b' remains intact without any breakthrough incursions into the paint stack from epoxy-based material that, instead, appears only in, and is restrained within the mixed surfacing layer 129 and the co-cured mixed surfacing layer 129'.

The following Example outlines discoloration testing of the composite structures according to present aspects.

EXAMPLE

The three-layer composite was tested for color retention after multiple autoclave cures by the following process. The delta E values can be less than about 0.3 or less than about 0.25 or less than about 0.23 or less than about 0.21 with up to ten (10) autoclave cures or up to five (5) autoclave cures. The results are shown below.

| | Cure 1 | | |
|---|---|---|---|
| Tested Surface | L | a | b |
| J4 × 5 only | 73.98 | −1.55 | −0.07 |
| SM905 + J4 × 5 | 74.39 | −1.15 | −1.85 |
| Metlbond 1515 + J4 × 5 | 74.6 | −1.18 | −2.46 |

| | Cure 2 | | |
|---|---|---|---|
| L | a | b | ΔE compared to cure 1 |
| 73.5 | −1.85 | 1.65 | 1.621905 |
| 74.18 | −1.16 | −1.49 | 0.395746 |
| 74.39 | −1.19 | −2.44 | 0.211039 |

| | Cure 3 | | |
|---|---|---|---|
| L | a | b | ΔE compared to cure 1 |
| 70.22 | −1.94 | 11.79 | 11.824922 |
| 74.1 | −1.25 | −1.14 | 0.735219 |
| 74.22 | −1.21 | −2.39 | 0.386568 |

| Cure 4 | | | |
|---|---|---|---|
| L | a | b | ΔE compared to cure 1 |
| 70.01 | −1.86 | 11.53 | 11.662888 |
| 73.94 | −1.27 | −0.66 | 1.21798 |
| 74.18 | −1.27 | −2.32 | 0.448398 |

The results show that after repeated autoclave cures, the delta E values, (that are color measurement values), become significantly lower. Measurement values under 0.2 are not visible to the naked eye. Therefore, through the use of the co-curable epoxy-based adhesive surfacing material set forth herein, and according to present aspects, unexpectedly superior results were obtained, at least in terms of color retention and the ability of the co-cured and polyurethane coated epoxy-based composite structures to resist UV discoloration of the composite material after multiple autoclave cures.

Further present aspects embrace the ability to manufacture co-curable and co-cured epoxy-based composite structures by introducing the various layers to a tool surface with the composite material introduced first, or last, so long as the co-curable and co-cured epoxy-based adhesive surfacing material layer is oriented adjacent to the composite material layer, with the co-curable and co-cured polyurethane coating material layer then oriented adjacent to the epoxy-based adhesive surfacing layer.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

The invention claimed is:

1. A co-curable polyurethane-coated epoxy-based composite material stack consisting of:
   a co-curable epoxy-based composite substrate, said co-curable epoxy-based composite substrate comprising a co-curable epoxy-based composite substrate outer surface;
   a co-curable epoxy-based adhesive surfacing material film layer disposed onto the co-curable epoxy-based composite substrate outer surface, said co-curable epoxy-based adhesive surfacing material film layer selected to begin curing at a curing temperature of about 150° F. and at a curing temperature lower than a co-curing temperature of the co-curable epoxy-based composite substrate outer surface;
   a single co-curable polyurethane-based coating material film layer disposed onto the co-curable epoxy-based adhesive surfacing material film layer to form the co-curable polyurethane-coated epoxy-based composite material stack, said single co-curable polyurethane-based coating material film layer in direct contact with the co-curable epoxy-based adhesive surfacing material film layer, said single co-curable polyurethane-based coating material film layer configured to alone impart UV protection to the co-curable polyurethane-coated epoxy-based composite material stack;
   wherein upon curing said co-curable epoxy-based composite substrate, said co-curable epoxy-based adhesive surfacing material film layer, and said single co-curable polyurethane-based coating material film layer are configured to co-cure at a co-curing temperature ranging from about 250° F. to about 400° F. to form a co-cured polyurethane-coated epoxy-based composite material stack;
   wherein upon co-curing the co-curable epoxy-based composite material substrate outer surface and the co-curable epoxy-based adhesive surfacing material film layer are configured to form a co-cured miscible layer, said co-cured miscible layer comprising an amount of epoxy-based material from the co-curable epoxy-based composite substrate, said co-cured miscible layer further comprising an amount of epoxy-based material from the co-curable epoxy-based adhesive surfacing material film layer;
   wherein after co-curing, the single co-curable polyurethane-based coating material film layer provides to the co-cured polyurethane-coated epoxy-based composite material stack an ultraviolet and visible transmittance value of 0% for wavelengths ranging from about 200 nm to about 800 nm when the single co-curable polyurethane-based coating material film layer comprises an average layer thickness ranging from about 2 mils to about 3 mils; and
   wherein said single co-curable polyurethane-based coating material film layer comprises a Tg ranging from about 0° F. to about 200° F.

2. The co-curable polyurethane-coated epoxy-based composite material stack of claim 1, wherein the co-curable epoxy-based adhesive surfacing material film layer is co-curable with the co-curable epoxy-based composite substrate and the co-curable epoxy-based adhesive surfacing material film layer is further co-curable with the single co-curable polyurethane-based coating material film layer at a temperature ranging from about 250° F. to about 350° F.

3. The co-curable polyurethane-coated epoxy-based composite material stack of claim 1, wherein said co-curable polyurethane-coated epoxy-based composite material stack has a delta E value of less than 0.3 after 10 autoclave cures.

4. The co-curable polyurethane-coated epoxy-based composite material stack of claim 3, wherein said delta E value is less than 0.25 after 10 autoclave cures.

5. The co-curable polyurethane-coated epoxy-based composite material stack of claim 1, wherein the co-curable epoxy-based adhesive surfacing material film layer comprises an amount of an epoxy-based material having a curing temperature ranging from about 250° F. to about 400° F., a Tg ranging from about 300° F. to about 450° F., and a gel time ranging from about 5 mins. to about 20 mins. when held at a temperature of ranging from about 240° F. to about 260° F.

6. The co-curable polyurethane-coated epoxy-based composite material stack of claim 1, wherein the co-curable epoxy-based adhesive surfacing material film layer comprises an amount of an epoxy-based material having a curing temperature ranging from about 250° F. to about 400° F., and a Tg ranging from about 320° F. to about 400° F., and a gel time ranging from about 5 to about 20 minutes when held at a temperature ranging from about 240° F. to about 260° F.

7. The co-curable polyurethane-coated epoxy-based composite material stack of claim 1, wherein the co-curable epoxy-based adhesive surfacing material film layer comprises an amount of an epoxy-based material having a curing temperature ranging from about 250° F. to about 400° F. a Tg ranging from about 330° F. to about 350° F. and a gel time ranging from about 5 to about 20 minutes when held at a temperature ranging from about 240° F. to about 260° F.

8. The co-curable polyurethane-coated epoxy-based composite material stack of claim 1:

wherein the co-curable epoxy-based adhesive surfacing material film layer in a co-cured state comprises a pencil hardness value according to ASTM D 3363-05 (2011)e2 of at least HB after 48 hours of exposure to direct exposure of a benzyl alcohol-based paint stripping agent; and wherein the single co-curable polyurethane-based coating material film layer in the co-cured state comprises a chemical resistance ranging from about H to about 6H measured by ASTM D3363.

9. A co-cured polyurethane-coated epoxy-based composite material stack consisting of:
   a co-cured epoxy-based composite substrate, said co-cured epoxy-based composite substrate comprising a co-cured epoxy-based composite substrate outer surface;
   a co-cured epoxy-based adhesive surfacing material layer disposed on the co-cured epoxy-based composite substrate outer surface, said co-cured epoxy-based adhesive surfacing material layer co-cured with the co-cured epoxy-based composite substrate to form a co-cured miscible region with the co-cured epoxy-based composite substrate, said co-cured miscible region comprising an amount of epoxy-based material from the co-cured epoxy-based composite substrate and an amount of epoxy-based material from the co-cured epoxy-based adhesive surfacing material layer;
   a single co-cured polyurethane-based coating material film layer co-cured with the co-cured epoxy-based adhesive surfacing material layer and the co-cured epoxy-based composite substrate, said single co-cured polyurethane-based coating material film layer in direct contact with the co-cured miscible region said co-cured polyurethane-coated epoxy-based coating material stack comprising an ultraviolet and visible transmittance value of 0% for wavelengths ranging from about 200 nm to about 800 nm when the single co-cured polyurethane-based coating material film layer comprises an average layer thickness ranging from about 2 mils to about 3 mils, said single co-cured polyurethane-based coating material film layer comprising a Tg ranging from about 0° F. to about 200° F.;
   wherein said co-cured epoxy-based adhesive surfacing material layer is configured to begin curing at about 150° F., and at a curing temperature lower than a curing temperature of the co-curable epoxy-based composite substrate;
   wherein said co-cured epoxy-based composite substrate, said co-cured epoxy-based adhesive surfacing material layer, and said single co-cured polyurethane-based coating material film layer are co-cured at a co-curing temperature ranging from about 250° F. to about 350° F.;
   wherein the single co-cured polyurethane-based coating material film layer alone is configured to impart UV protection to the co-cured epoxy-based composite substrate;
   wherein the co-cured miscible region impedes epoxy-based material from the co-cured epoxy-based composite substrate from migrating into the single co-cured polyurethane-coated epoxy-based composite material film layer; and
   wherein the co-cured polyurethane-coated epoxy-based composite material stack comprises an amount of an epoxy-based material co-cured at a co-curing temperature ranging from about 250° F. to about 400° F., and a Tg ranging from about 300° F. to about 450° F., and a gel time ranging from about 5 minutes to about 20 minutes when held at a co-curing temperature ranging from about 240° F. to about 260° F.

10. The co-cured polyurethane-coated epoxy-based composite material stack of claim 9, wherein the co-cured polyurethane-coated epoxy-based composite material stack withstands 48 hours of direct exposure of a benzyl alcohol-based paint stripping agent without visible damage to the co-cured epoxy-based adhesive surfacing material layer.

11. The co-cured polyurethane-coated epoxy-based composite material stack of claim 9 wherein the co-cured polyurethane-coated epoxy-based composite material stack resists discoloration when exposed to UV radiation wavelengths ranging from about 200 nm to about 800 nm.

12. An object comprising the co-cured polyurethane-coated epoxy-based composite material stack of claim 9.

13. A vehicle comprising the object of claim 12.

14. The vehicle of claim 13, wherein the vehicle is selected from at least one of:
   a manned aircraft, an unmanned aircraft, a manned spacecraft, an unmanned spacecraft, a manned rotorcraft, an unmanned rotorcraft, a manned terrestrial vehicle, an unmanned terrestrial vehicle; a manned surface water borne vehicle, an unmanned waterborne vehicle, a manned sub-surface water borne vehicle, a satellite, and combinations thereof.

15. The co-cured polyurethane-coated epoxy-based composite material stack of claim 9:
   wherein the co-cured epoxy-based adhesive surfacing material in a co-cured state comprises a pencil hardness value according to ASTM D 3363-05(2011)e2 of at least HB after 48 hours of exposure to direct exposure of a benzyl alcohol-based paint stripping agent; and
   wherein said single co-cured polyurethane-based coating material film layer comprises a chemical resistance ranging from about H to about 6H measured by ASTM D3363.

16. A method for improving UV radiation resistance of a co-cured polyurethane-coated epoxy-based composite material stack, the method consisting of:
   applying a co-curable epoxy-based adhesive surfacing material film layer to an outer surface of a co-curable epoxy-based composite substrate, said co-curable epoxy-based adhesive surfacing material film layer configured to begin curing at a curing temperature of about 150° F. and at a temperature lower than a curing temperature of the co-curable epoxy-based composite substrate;
   applying a single co-curable polyurethane-based coating material film layer comprising a Tg ranging from about 0° F. to about 200° F. to the co-curable epoxy-based adhesive surfacing material film layer to form a co-curable polyurethane-coated epoxy-based composite material stack, said single co-curable polyurethane-based coating material film layer in direct contact with the co-curable epoxy-based adhesive surfacing material film layer;
   beginning curing of the co-curable epoxy-based adhesive surfacing material film layer at a curing temperature of about 150° F. and at a curing temperature lower than a co-curing temperature of the co-curable epoxy-based composite substrate;
   co-curing the co-curable polyurethane-coated epoxy-based composite material stack at a predetermined co-curing regimen that comprises co-curing the co-curable polyurethane-coated epoxy-based composite material stack at a co-curing temperature ranging from about 250° F. to about 400° F. to form the co-cured polyurethane-coated epoxy-based composite material stack comprising a co-cured epoxy-based composite substrate, a co-cured epoxy-based surfacing material film layer, and a single co-cured polyurethane-based coating material film layer;

forming a co-cured miscible layer comprising an amount of epoxy-based material from the co-cured epoxy-based composite substrate and an amount of epoxy-based material from the co-curable epoxy-based adhesive surfacing material film layer, said co-cured miscible layer configured to impede migration of epoxy-based material from the co-cured epoxy-based composite substrate to an outer surface of the co-cured polyurethane-coated epoxy-based composite material stack;

imparting UV protection to the co-cured polyurethane-coated epoxy-based composite material stack in the single co-cured polyurethane-based coating material film layer; and wherein the co-cured polyurethane-coated epoxy-based composite material stack has an ultraviolet and visible transmittance value of 0% for wavelengths ranging from about 200 nm to about 800 nm when the single co-curable polyurethane-based coating material film layer comprises an average layer thickness ranging from about 2 mils to about 3 mils.

17. The method of claim 16, wherein the co-cured polyurethane-coated epoxy-based composite material stack resists discoloration caused by exposure to UV radiation at wavelengths ranging from about 200 nm to about 800 nm.

18. The method of claim 16, wherein the co-curable epoxy-based adhesive surfacing material layer in a co-cured state is configured to withstand 48 hours of direct exposure of a benzyl alcohol-based paint stripping agent without visible damage to the co-curable epoxy-based adhesive surfacing material layer in the co-cured state; and wherein the co-curable epoxy-based adhesive surfacing material layer in the co-cured state is configured to comprise a pencil hardness value according to ASTM D 3363-05(2011)e2 of at least HB after 48 hours of exposure to direct exposure of the benzyl alcohol-based paint stripping agent.

19. The method of claim 16, wherein the predetermined co-curing regimen comprises:

the co-curing temperature ranging from about 250° F. to about 350° F.; and wherein the co-curable epoxy-based adhesive surfacing material layer comprises an amount of an epoxy-based material, said amount of the epoxy-based material comprising a curing temperature ranging from about 250° F. to about 400° F., and a Tg ranging from about 300° F. to about 430° F., and a gel time ranging from about 5 to about 20 minutes when held at a temperature ranging from about 240° F. to about 260° F.

20. The method of claim 16, wherein the predetermined co-curing regimen comprises:

the co-curing temperature ranging from about 250° F. to about 350° F.; and wherein the co-curable epoxy-based adhesive surfacing material layer comprises an amount of an epoxy-based material, said amount of the epoxy-based material comprising a curing temperature ranging from about 250° F. to about 400° F., and a Tg ranging from about 320° F. to about 400° F., and a gel time ranging from about 5 to about 20 minutes when held at a temperature ranging from about 240° F. to about 260° F.

21. The method of claim 16, wherein the predetermined co-curing regimen comprises:

the co-curing temperature ranging from about 250° F. to about 350° F.; and wherein the co-curable epoxy-based adhesive surfacing material layer comprises an amount of an epoxy-based material, said amount of the epoxy-based material having a curing temperature ranging from about 250° F. to about 400° F., and a Tg ranging from about 330° F. to about 350° F., and a gel time ranging from about 5 to about 20 minutes when held at a temperature ranging from about 240° F. to about 260° F.

* * * * *